United States Patent Office 3,087,941  
Patented Apr. 30, 1963

3,087,941  
17α-BROMO-6-METHYL-PREGNANE DERIVATIVES  
Charles Robert Engel, Sillery, Quebec, Canada, assignor to Canadian Patents and Development Limited, Ottawa, Ontario, Canada  
No Drawing. Filed Mar. 30, 1961, Ser. No. 99,338  
3 Claims. (Cl. 260—397.4)

The present invention is concerned with steroid progestins, particularly 17α-halogenated-6α-alkylated progesterone derivatives, and a method for their preparation. The progestationally active compound 17α-bromo-6α-methyl-progesterone, has been prepared, together with certain novel intermediates.

The progestational activity of 17α-bromo- and -chloro-progesterones had previously been found to be significant (see U.S. Serial No. 694,091 filed November 4, 1957, C. R. Engel). It has now been found that the presence of a 6α-methyl substituent enhances the activity of 17α-haloprogesterones—in particular 17α-bromoprogesterone.

The synthesis may be described briefly as follows: The starting material, 3β-acetoxy-20-ethylenedioxy-5-pregnene (II), which can be prepared readily and in high yield from 3β-acetoxy-5-pregnene-20-one (pregnenolone acetate) (I), as described by M. Gut (J. Org. Chem. 21, 1327 (1956)), is treated with an organic peracid, and from the resulting reaction mixture the 3β-acetoxy-20-ethylenedioxy-5α,6α-epoxy-pregnane (III) is isolated in good yield. This compound is treated with a methyl Grignard reagent, to give 3β,5α-dihydroxy-20-ethylenedioxy-6β-methyl-pregnane (IV) which is transformed to 3β,5α-dihydroxy-6β-methyl-pregnane-20-one (V) on liberation of the 20-keto group, by the action of an acidic agent, or alternatively by an exchange reaction with a ketone. Subsequent acetylation of the thus obtained 3β,5α-dihydroxy-6β-methyl-pregnane-20-one (V) gives 3β-acetoxy-5α-hydroxy-6β-methyl-pregnane-20-one (Va).

A free radical bromination of (Va) in an inert solvent is effected to introduce a 17α-bromine substituent (compare Formula VI). The crude product VI is hydrolyzed under acid conditions to yield 17α-bromo-3β,5α-dihydroxy-6β-methyl-pregnane-20-one (VII), which can be readily purified. Oxidation of VII is effected (preferably by chromic acid in an acidic medium) to give 17α-bromo-5α-hydroxy-6β-methyl-pregnane-3,20-dione (VIII). Dehydration with concomitant epimerization in position 6, with an acid, gives the desired 17α-bromo-6α-methyl-4-pregnene-3,20-dione (17α-bromo-6α-methylprogesterone) IX.

The process is illustrated as follows:

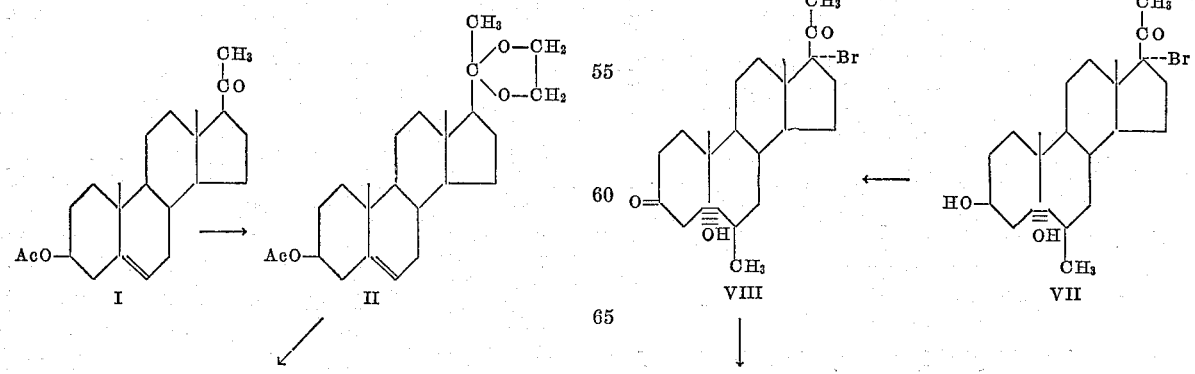

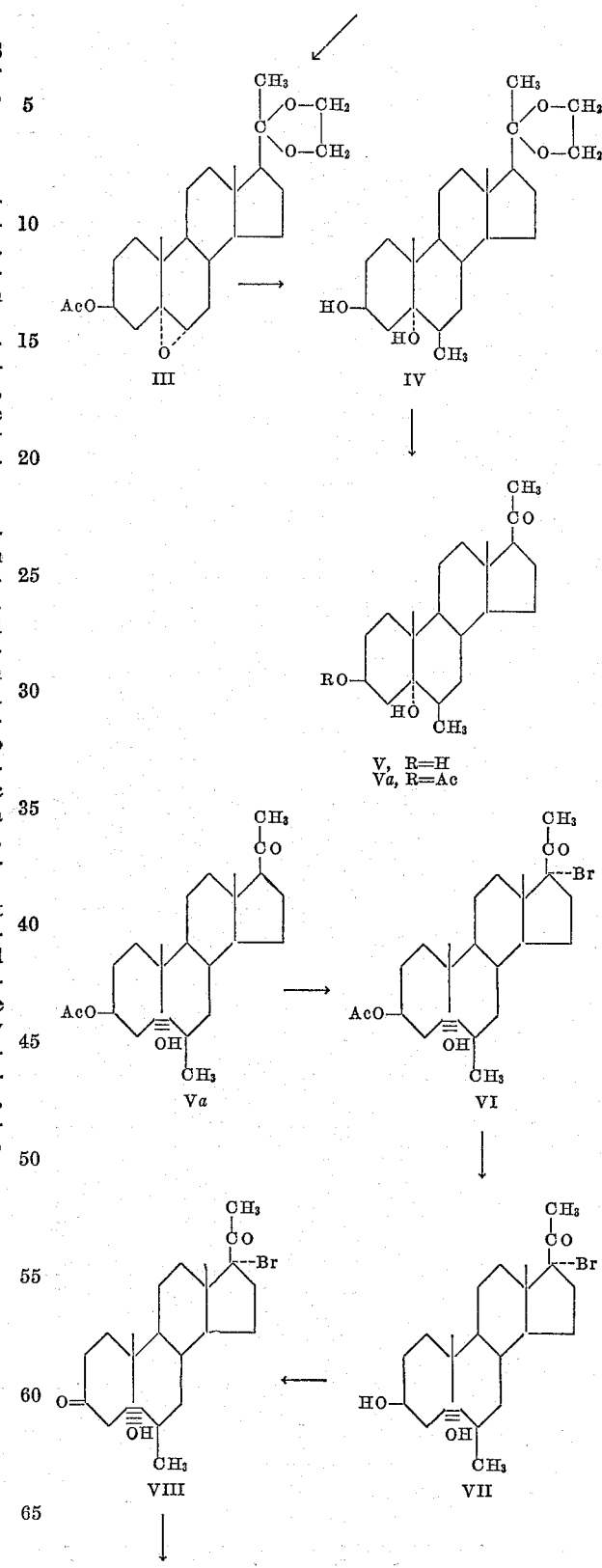

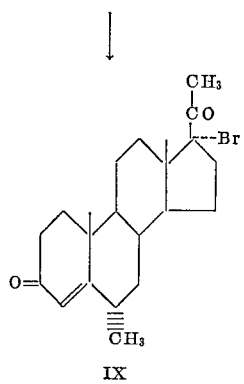

IX

In the above formulae, Ac means acetyl (CH₃CO), although other acyl groups may be used.

The introduction of the 5α,6α-epoxy group into II is advantageously effected by organic peracids such as perphthalic, perbenzoic or peracetic acid at low temperatures. The Grignard reagent used to treat the 5α,6α-epoxy compound III may be methyl magnesium bromide, -chloride or -iodide. The resulting product IV can be purified by chromatographic techniques. However, it is not necessary to isolate the intermediate 3β,5α-dihydroxy-20-ethylenedioxy-6β-methyl-pregnane IV; the crude product of the Grignard reaction can be treated directly to free the 20-keto group.

This transformation of IV to V is effected by an acidic agent such as sulphuric or hydrochloric acid in an aqueous alcohol solution. Alternatively an exchange reaction with a ketone such as acetone in the presence of an acid catalyst such as p-toluene-sulphonic acid can be carried out. The acetylation of V to give Va is advantageously effected by the action of acetic anhydride in pyridine at room temperature.

The bromination of Va can be effected by such agents as N-bromoacetamide and N-bromosuccinimide in an inert solvent, e.g. carbon tetrachloride—optionally in the presence of a small amount of a tertiary organic base such as pyridine.

The hydrolysis of VI to give the 3β-hydroxy compound VII is carried out using acids, such as hydrochloric or perchloric acid in an aqueous alcoholic solvent. The product 17α-bromo-3β,5α-dihydroxy-6β-methyl-pregnane-20-one VII can be purified readily by chromatography. For instance the product is dissolved in benzene, absorbed on silica gel, eluted with benzene-ethyl acetate mixtures and recrystallized from ether-acetone.

Oxidation of VII to VIII is usually carried out by chromic acid in an acid medium such as acetic acid, or sulphuric acid in acetone. The chromic acid-pyridine complex can also be used.

The dehydration-epimerization of VIII to 17α-bromo-6α-methyl-progesterone IX can be conducted in the presence of hydrogen chloride in acetic acid or chloroform; or with concentrated hydrochloric acid and acetic acid at room temperature. An oxalic acid solution at elevated temperature can also effect the conversion of VIII to IX.

Potent progestational agents, particularly orally active products, encounter considerable attention. It has now been found that the new compound 17α-bromo-6α-methyl-progesterone is progestationally active when administered parenterally or orally and is devoid of undesirable side effects, such as androgenic activity or metastatic-like changes in the endometrium.

The following examples illustrate the process and give details of the products of the present invention, but are not intended to be limiting.

EXAMPLE I

*3β-Acetoxy-20-Ethylenedioxy-5α,6α-Epoxy-Pregnane (III)*

To a solution of 8 g. of 3β-acetoxy-20-ethylenedioxy-5-pregnene (II), M.P. 156–158°, in 600 cc. of chloroform, was added at −80° C., 105 cc. of a 0.4 N monoperphthalic acid solution in ether, over a period of 20 minutes. The mixture was kept at −80° C. for 2 hours and for a further 16 hours at a temperature of 0–5° C. Subsequently, the resulting solution was washed with cold 5% sodium carbonate solution and with water; and was then dried over sodium sulphate. Removal of the solvent gave 8.8 g. of a product which yielded, upon recrystallization from methanol, 5.2 g. of pure 3β-acetoxy-20-ethylenedioxy-5α,6α-epoxy-pregnane, M.P. 183–185° C. The analytical sample melted at 184–186° C., $[\alpha]_D^{25}$ −50°.

EXAMPLE II

*3β,5α-Dihydroxy-20-Ethylenedioxy-6β-Methyl-Pregnane (IV)*

A solution of 3 g. of 3β-acetoxy-20-ethylenedioxy-5α,6α-epoxy-pregnane (III) in 450 cc. of absolute benzene was added to a solution of methyl magnesium bromide prepared from 1.5 g. of magnesium, 100 cc. of absolute ether and a slight excess of methyl bromide. The reaction mixture was refluxed for four hours. After cooling, the excess reagent was decomposed with an aqueous ammonium chloride solution and the organic layer was washed with aqueous ammonium chloride and with water and was then dried over sodium sulphate. Removal of the solvent afforded 2.9 g. of a solid which was absorbed on aluminum oxide (pH 7.5). Elution with ether-benzene mixtures (1:4 and 1:1), and finally with ether, yielded 1.4 g. of 3β,5α-dihydroxy-20-ethylenedioxy-6β-methyl-pregnane, M.P. 162–164° C. Further recrystallization raised the melting point to 168–169.5° C.

EXAMPLE III

*3β-Acetoxy-5α-Hydroxy-6β-Methyl-Pregnane-20-One (Va)*

A solution of 1.3 g. of 3β,5α-dihydroxy-20-ethylenedioxy-6β-methyl-pregnane (IV) and 175 mg. of p-toluene-sulphonic acid in 100 cc. of acetone was refluxed for one hour. The volume of the solution was reduced to 25 cc. in vacuo and the residue poured into an iced bicarbonate solution. The resulting mixture was extracted with dichloromethane. The organic layer was washed with water and dried over sodium sulphate. When the solvent was removed, the residue, representing crude 3β,5α-dihydroxy-6β-methyl-pregnane-20-one (V), was dissolved in 4 cc. of absolute pyridine. To this solution was added 1 cc. of acetic anhydride and the mixture was kept at room temperature for 16 hours. Ice and methanol were added and the mixture was extracted with ether. The ethereal solution was washed repeatedly with iced dilute hydrochloric acid solution, with iced bicarbonate solution and with water and dried over sodium sulphate. When the solvent was removed there was obtained 1.15 g. of a solid which gave, upon crystallization with acetone-ether, 800 mg. of 3β-acetoxy-5α-hydroxy-6β-methyl-pregnane-20-one (Va), M.P. 195–197° C. Further recrystallization gave a product melting at 198–200° C., $[\alpha]_D^{25}$ +29.6°. The mother liquors of the first crystallization were chromatographed on aluminum oxide and gave a further 240 mg. of Va, melting at 195–196° C.

EXAMPLE IV

*17α-Bromo-3β-Acetoxy-5α-Hydroxy-6β-Methyl-Pregnane-20-One (VI)*

To a solution of 800 mg. of 3β-acetoxy-5α-hydroxy-6β-methyl-pregnane-20-one (Va) in 62 cc. of carbon tetrachloride, 0.02 cc. of absolute pyridine was added. The mixture was refluxed for 13 minutes with 273 mg. of N-bromosuccinimide over a photo-flood lamp. The product was cooled and filtered over anhydrous sodium sulphate. The filtrate was washed four times with water and dried over sodium sulphate. On removal of solvent, in vacuo, 1.085 g. of an amorphous product was obtained which was hydrolyzed without further purification as described below.

EXAMPLE V

*17α-Bromo-3β,5α-Dihydroxy-6β-Methyl-Pregnane-20-One (VII)*

To a solution of 800 mg. of the crude bromination product from Example IV, in 120 cc. of methanol, was added 5 cc. of 70% perchloric acid; the mixture was stored at room temperature for 22 hours. Subsequently, the solution was poured into iced sodium bicarbonate solution and the precipitate was extracted with methylene chloride. The organic layer was washed with water and dried over sodium sulphate. Removal of the solvent gave 700 mg. of an amorphous product which afforded, upon purification by chromatography on silica gel and by recrystallization (as described above using a benzene solution, absorbing on Davison's No. 923 silica gel, eluting with benzene-ethyl acetate (3:1), and recrystallizing from ether-acetone) 500 mg. of 17α-bromo-3β,5α-dihydroxy-6β-methyl-pregnane-20-one (VII), M.P. 155–158° C.

EXAMPLE VI

*17α-Bromo-5α-Hydroxy-6β-Methyl-Pregnane-3,20-Dione (VIII)*

To a solution of 250 mg. of 17α-bromo-3β,5α-dihydroxy-6β-methyl-pregnane-20-one (VII) in 30 cc. of absolute acetone, was added at 0–5° C., 0.8 cc. of an oxidizing solution prepared by dissolving 266 g. of chromic acid in 230 cc. of concentrated sulphuric acid and 770 cc. of water. The mixture was stirred for three minutes and poured into iced sodium bicarbonate solution. The resulting precipitate was extracted with dichloromethane and the organic phase was washed with water and dried over sodium sulphate. Removal of the solvent afforded 240 mg. of a semi-crystalline solid which, upon crystallization from acetone-ether, yielded 190 mg. of 17α-bromo-5α-hydroxy-6β-methyl-pregnane-3,20-dione (VIII), M.P. 169–170° C.

EXAMPLE VII

*17α-Bromo-6α-Methyl-4-Pregnene-3,20-Dione (IX)*

A solution of 170 mg. of 17α-bromo-5α-hydroxy-6β-methyl-pregnane-3,20-dione (VIII) in 30 cc. of glacial acetic acid was flushed for two hours with a dry stream of hydrogen chloride at 10° C. Subsequently, the product was kept for 16 hours at room temperature and poured into an iced salt solution. The precipitate was collected, washed with water, and dried. Upon crystallization from acetone-ether there was obtained 120 mg. of 17α-bromo-6α-methyl-4-pregnene-3,20-dione (IX), M.P. 150–151° C., $[\alpha]_D^{26} +10.5°$ $\lambda_{max.}^{EtOH}$ 236 mμ (log ε 4.2)

I claim:

1. 17α - bromo - 3β - acetoxy - 5α - hydroxy - 6β - methyl-pregnane-20-one.
2. 17α - bromo - 3β,5α - dihydroxy - 6β - methyl - pregnane-20-one.
3. 17α - bromo - 5α - hydroxy - 6β - methyl - pregnane - 3,20-dione.

References Cited in the file of this patent

UNITED STATES PATENTS

| | | |
|---|---|---|
| 2,897,217 | Spero | July 28, 1959 |
| 2,924,610 | Marshall | Feb. 9, 1960 |
| 2,981,659 | Fonken et al. | Apr. 25, 1961 |
| 2,986,572 | Engle | May 30, 1961 |

OTHER REFERENCES

Textbook of Endocrinology, Selye, page 70.